Feb. 17, 1931.                H. J. NEUFANG                1,793,242
                                   PLOW
                     Filed Jan. 16, 1928        5 Sheets-Sheet 1
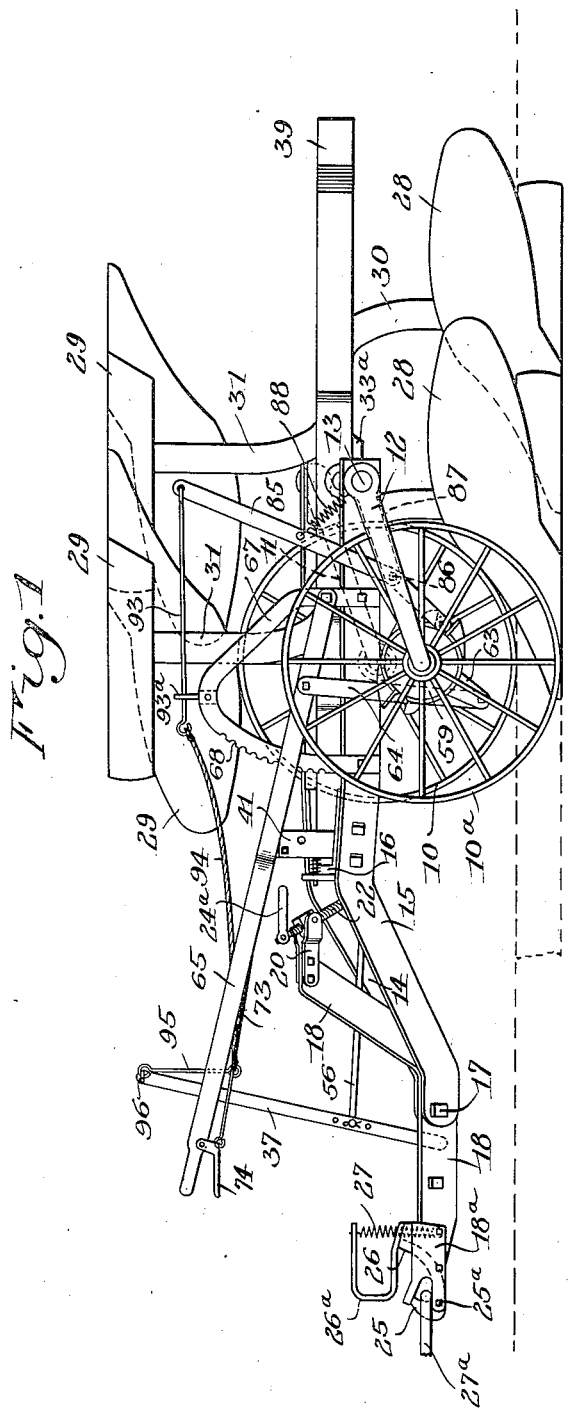
INVENTOR
Henry J. Neufang
BY
his ATTORNEYS

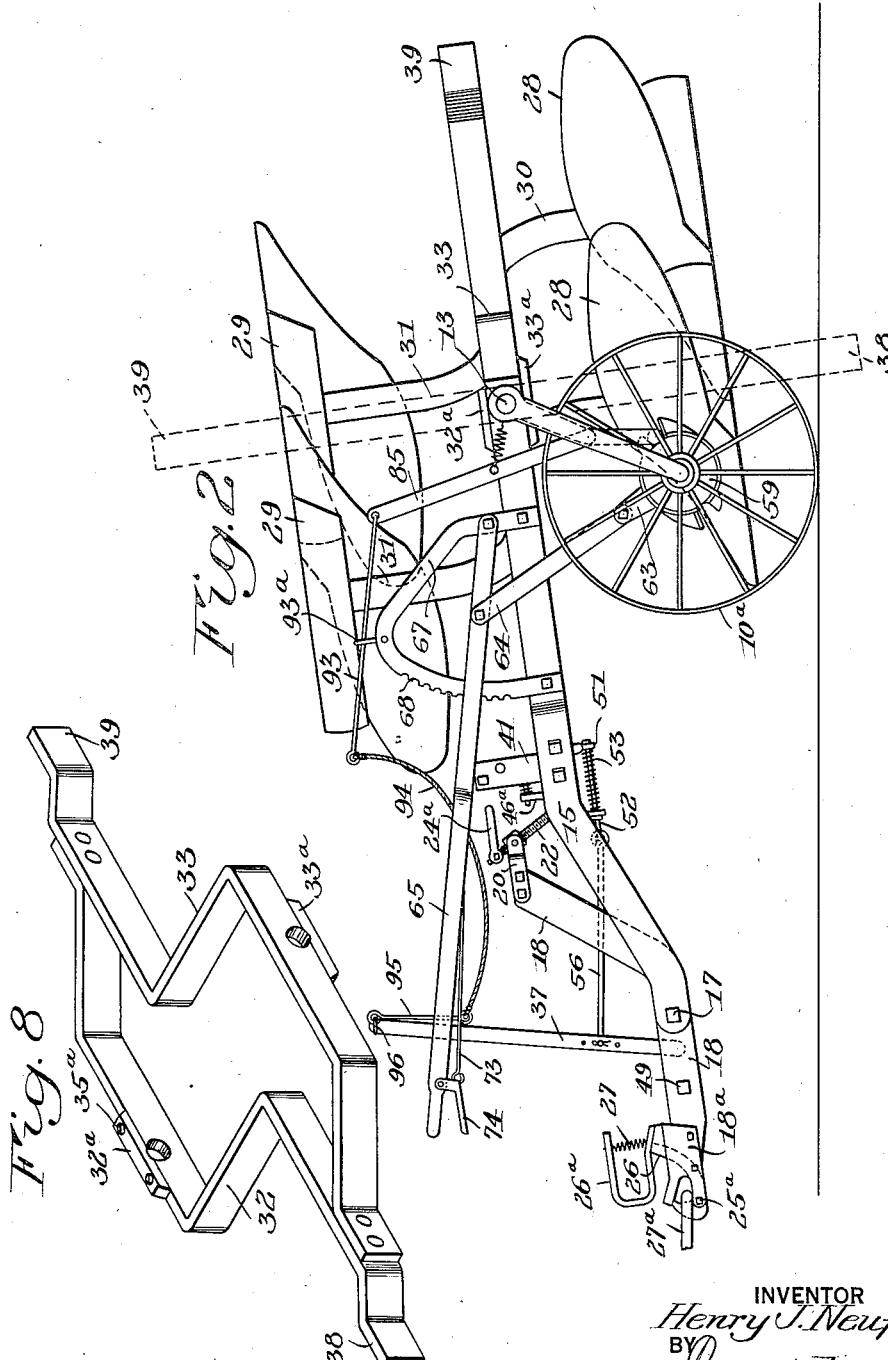

Feb. 17, 1931.  H. J. NEUFANG  1,793,242
PLOW
Filed Jan. 16, 1928   5 Sheets-Sheet 3

INVENTOR
Henry J. Neufang
BY
Crumpacker Griffith
his ATTORNEYS

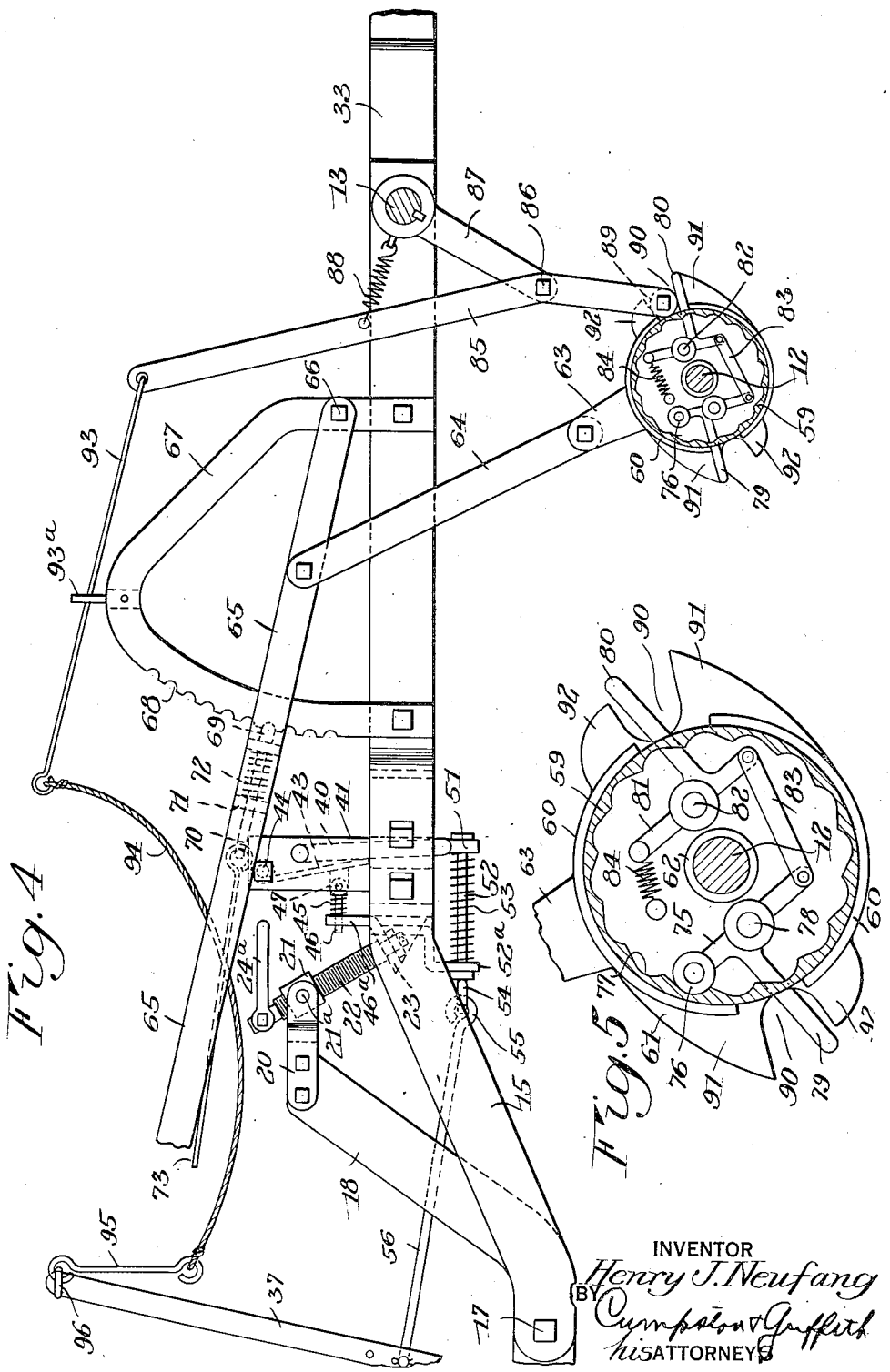

Feb. 17, 1931. H. J. NEUFANG 1,793,242
PLOW
Filed Jan. 16, 1928 5 Sheets-Sheet 5
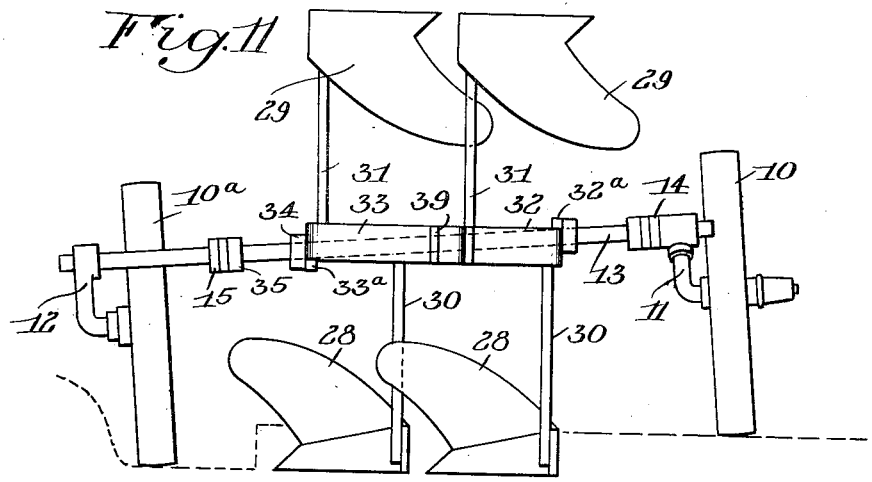
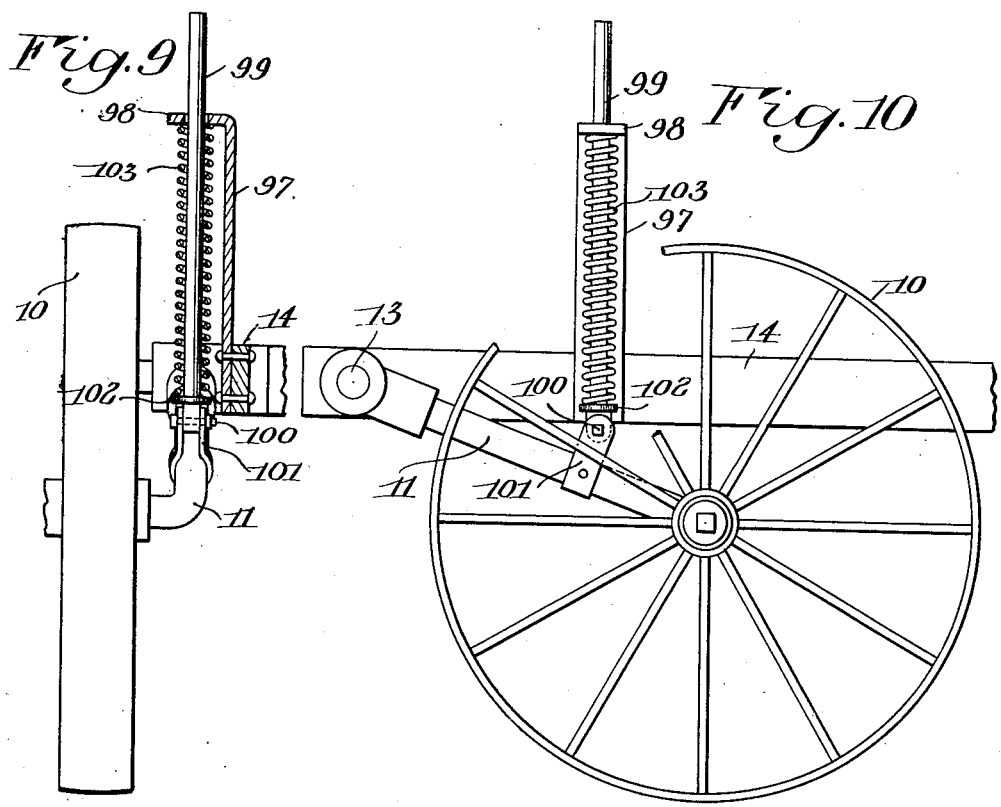
INVENTOR
Henry J. Neufang
BY
his ATTORNEYS Patented Feb. 17, 1931

1,793,242

UNITED STATES PATENT OFFICE

HENRY J. NEUFANG, OF ATLANTA, NEW YORK, ASSIGNOR, BY DIRECT AND MESNE ASSIGNMENTS, TO BOGGS PLOW COMPANY, INC., OF ATLANTA, NEW YORK, A CORPORATION OF NEW YORK

PLOW

Application filed January 16, 1928. Serial No. 247,003.

The present invention relates to plows and more particularly to a reversible plow for right and left hand plowing, the object being to provide an improved plow of this type, which is compact, simple in construction, convenient to control and effective in operation.

A further object is to provide improved means for varying the depth of operation of the plows, for placing them on an even keel at various depths and for regulating or varying the height of the line of draft.

A further object is to provide in conjunction with the raising and holding devices for the plow carrying frames improved means for effecting release of both at the same time by one operation or separate and independent release of one in advance of another.

A further object of the invention is to provide an improved right and left hand reversible plow having a plow carrying frame provided with a lifting device and with additional lifting means cooperating therewith to raise the plow and serving also to cushion the same when lowered to ground engaging position whereby to prevent breaking of the plow points or other parts of the plow when contacting with the ground.

To these and other ends the invention resides in certain improvements and combinations of parts, all as will be hereinafter more fully described, the novel parts being pointed out in the claims at the end of the specification.

In the drawings:

Fig. 1 is a side elevation illustrating one embodiment of the invention;

Fig. 2 is a similar view showing the plow in raised position;

Fig. 3 is a top plan view with one set of plows removed;

Fig. 4 is a fragmentary sectional elevation illustrating on an enlarged scale the plow raising clutch in uncoupled relation with respect to the wheel drum;

Fig. 5 is a detailed sectional elevation through the wheel drum showing the clutch in coupled position;

Fig. 6 is a fragmentary sectional elevation illustrating the means for latching the reversible plow supporting frame in one of its operating positions, said means being shown in release position;

Fig. 7 is a sectional elevation taken on line 7a—7a of Fig. 6;

Fig. 8 is a perspective view of the plow carrying frame showing the manner of offsetting the bearings for the transverse axle by which the frame is supported whereby the axle is inclined to the plane of the frame;

Fig. 9 is a fragmentary sectional elevation showing the means for assisting in the lifting of the frame from lowered position and for cushioning the same when lowered to ground engaging position;

Fig. 10 is a side elevation as viewed from the left of Fig. 9, and

Fig. 11 is diagrammatic rear elevation of the plow with certain parts removed, showing the axle inclined to the horizontal with one wheel operating in the furrow.

Similar reference numerals throughout the several views indicate the same parts.

The invention embodies an improved right and left hand plow of the type disclosed in my co-pending application, filed January 19, 1927, and bearing Serial No. 162,190.

The improvements relate generally to the mechanism by which relative adjustment can be effected between the draft beam and plow carrying frame both to accommodate the beam to tractors having draft attachments at varying heights from the ground and to so position the frame as to maintain the plows on an even keel, regardless of the depth at which they are adjusted to operate. In other words, an improved draft beam and frame construction is provided having means for effecting the relative adjustments mentioned in a simple and effective manner and by which means the depth at which the plows operate can also be regulated. Further improvements relate to the operating or control devices for releasing the clutch and frame holding mechanisms, said devices being so constructed and arranged as to permit operation of both by the use of one hand either simultaneously or separately and independently as desired. A still further improvement relates to a device for assisting in the raising of the plow from lowered or operating position to elevated position and for cushioning the same when lowered to ground engaging position.

The invention embodies an improved right and left hand plow, which may be horse drawn or pulled by a tractor or other power machines as desired and embodies a pair of wheels 10 and 10a together with axles 11 and 12 and a transverse bar 13 connecting them and forming in effect a crank axle. A main frame is disposed between the wheels comprising frame bars 14 and 15 connected by a transverse bar 16, Fig. 3. The rear ends of the frame bars 14 and 15 are free to swing on the transverse shaft or bar 13. The front ends of the frame bars are convergently arranged and connected by a bolt 17 on which is pivotally mounted intermediate its end a draft beam 18. The rear end of the draft beam is preferably offset upwardly and has secured thereon a pair of spaced arms 20. A block 21 is disposed between the arms and carries trunnions 21a journalled in the arms to permit the block to swing thereon. An adjusting screw 22 is threaded through the block and has its lower end rotatably supported by a bracket 23 secured on the transverse bar 16 by bolts 23a. The opening 24 in which the screw rotates is large enough to permit it to swing slightly to one side or another, so that it will more readily accommodate itself to the different positions of adjustment of the draft beam. The upper end of the screw is provided with an operating handle 24a which is pivoted to swing upon the screw to different operating positions. On the front end of the draft beam is disposed a coupling device indicated generally at 18a and by which the plow may be readily connected with a tractor or any suitable draft or pulling means. The coupling device embodies generally a lever 25 pivoted at 25a and having a tail portion 26 held by a pivoted latch 26a which in turn is held by a spring 27 adapted to yield under an excessive load on the lever to automatically release the same. A draft connection 27a engages the lever and is freed therefrom when the spring 27 yields to release the same. The draft connection constitutes a part of the tractor not shown.

Adjustment of the screw serves to raise or lower the front end of the draft beam to adjust it for tractors having draft attachments at varying distances from the ground. Sufficient play is provided between the draft lever 25 and the connection 27a to permit the plow carrying frames to be swung from the the lowered position shown in Fig. 1 to the elevated position shown in Fig. 2, whether or not the draft connection is of the flexible or rigid type. An additional advantage of the adjustable draft beam is that the adjusting screw may be rotated to effect adjustment of the main frame relative to the draft beam whereby to position the plows on an even keel regardless of the depth of furrow to be plowed or the height of the draft connection from the ground.

Two sets of plows, indicated generally at 28 and 29, are provided with short beams or standards 30 and 31 respectively having their inner ends bent and suitably secured to a rigid frame construction adapted to swing about a transverse axis afforded by the pivot member 13, said frame construction comprising the angular shaped bars 32 and 33 which are connected in any suitable manner and through which the pivot bar 13 is extended. The frame is held against lateral movement by suitable collars 34 rigidly secured on the pivot bar as shown in Fig. 3. The frame members 14 and 15 have their rear ends pivoted on the bar 13 and are held against lateral movement thereon by suitable collars or brackets 35. The frame bars 32 and 33 are provided with extended end portions 38 and 39 respectively for engaging the ground during the swinging operations from one position of adjustment to another while the plow is advancing. The plow points and mold-boards of the two sets of plows also serve to assist in causing the plow holding frame to rotate upon its axis through successive engagement with the ground, following the initial swinging movement produced by one or the other of said ends dropping to ground engaging position while the plow is advancing.

The bar 32 of the plow carrying frame is provided at one side with a removable bearing portion 32a and the opposite bar 33 is provided at one side with a removable bearing portion 33a. These portions serve to increase the depth of the bars at the bearing points of the pivot bar 13 to provide sufficient material to permit one of the bearings for said bar to be offset upwardly and the other downwardly so that the pivot bar will be inclined to the horizontal, which is necessary since one of the wheels of the plow operates within while the other travels without the furrow. By thus offsetting the bearings for the pivot bar or drilling the holes for the same at the proper inclination to take care of the difference in the operating positions of the wheels, the plow carrying frame, in either position to which it is swung will remain substantially horizontal. Thus the plows will be maintained on an even keel regardless of the fact that one wheel operates within the furrow while the other operates on unplowed ground as shown in Figs. 1 and 11.

The revoluble frame is normally held during operation of the plows in the position shown in Fig. 1 by the holding means shown in Figs. 6 and 7. This means preferably comprises a yoke-shaped member 40 disposed between and pivotally supported by a pair of angularly shaped bracket members 41 having their lower ends bent and rigidly secured upon the transverse frame bar 16 by bolts 42. The revoluble frame is prevented from swinging upwardly by a latch member 43 pivoted at 44 between the bracket members 41 and is held in latching position as shown in Fig. 6 by a spring 45 on a stem 46, the rear end of which is pivotally connected with the latch at 47 while its front end is slidably supported by an upstanding portion 46a of the bracket 23. The spring 45 is adapted to urge the latch 43 to the position shown in Fig. 6, the latch being automatically displaced by the ends 38 and 39 of the frame when moving downwardly into engagement therewith, but being automatically returned by the spring 45 when said ends reach their lowest position in the yoke 40.

Release of the frame for a rotating movement is effected by moving the yoke 40 to the position shown in Fig. 6 which is accomplished through the medium of a lever 37 forked at its lower end and arranged to straddle a support 38, one end of which is secured by the pivot bolt 17 of the draft beam and the other by a bolt 49 connected with the draft beam. The lever is pivotally connected with the member 38 by a bolt 50, Fig. 3. The yoke 40 is provided with a crank arm 51 actuated by a rod 52 slidably disposed in a bracket 52a and is automatically returned by a spring 53 when the lever 37 is released. The rod 52 is provided with a looped head 54 linked with a corresponding head 55 on a forwardly extending connection 56 having pivotal engagement with the lever 37 intermediate its ends. The bracket 52a is secured upon one end of bracket 23 by one of the bolts 23a thereof.

The mechanism for regulating the depth at which the plows are adapted to operate and for raising the frame upon which the plows are mounted include cooperating parts for effecting both movements as will hereinafter appear.

The raising of the frame at the end of each furrow to a position at which it can be readily swung upon its transverse axis or about the shaft 13 is effected by means of a suitable clutch such as that illustrated in Figs. 4 and 5, these views showing the clutch respectively in normal release and coupled positions. Upon advancement of the wheels with the clutch in coupled position the main frame including the shaft or pivot bar 13 will be elevated as indicated in Figure 2, the yoke 40 being moved to release position to permit the front end of the plow carrying frame to swing downwardly into engagement with the ground. Upon further advancement of the plow the frame, by reason of its contact with the ground will be swung through an angle of approximately 90° to substantially horizontal position, being limited in its movement by the yoke 40 when it reaches the position shown in Figure 6. As either end 38 or 39 approaches this position it automatically moves the latch 43 forwardly, the latter being returned to locking position by the spring 45 as soon as said end is moved to its lowest position within the yoke. These adjustments are effected at the end of the furrow and when completed the plows are lowered ready for the plowing of the next succeeding furrow. The dotted line position of the plow carrying frame indicated in Fig. 2 shows the position of the same after it has rotated through an angle of approximately 90° as a result of the action of gravity in pulling it down and the swinging movement given it through contact with the ground.

The clutch is preferably shown applied to one wheel only but may be applied to both if desired. It embodies a drum 59 rigidly connected with the wheel 10a and normally rotates within the arcuate portions 60 of a casing 61 having a sleeve 62 journalled on the inner end of the axle 12 and held against longitudinal movement upon the axle by any suitable means not shown. The casing 61 carries an arm 63 pivotally connected with a link 64 which in turn is pivotally connected with an operating lever 65. The lever is pivoted at 66 to an upstanding support 67, preferably comprising an inverted U-shaped frame member, the lower ends of which are suitably connected with the forwardly extending frame member 15 as shown in Figure 4. The forward leg of the U-shaped frame member is provided with a series of notches 68 adapted to receive a pawl 69 on a stem 70 slidably mounted in a lug 71 on the lever 65, the stem carrying a spring 72 for moving the pawl to locking position when released. An operating rod 73 for releasing the pawl 69 is connected at its inner end with the stem 70 and at its outer end with a hand grip lever 74 of any preferred type.

The casing 61 is coupled with the drum 59 when desired by a lever 75 having a roller 76 adapted to take into notches 77 of the drum as shown in Figure 5. The lever 75 is pivoted to the casing at 78 and is provided with an operating extension 79 similar to an extension 80 on a control lever 81 which is pivoted to said casing at 82 and operatively connected with the lever 75 by a link 83. A spring 84 is adapted to move the lever 75 to a clutching position as shown in Figure 5 when the lever arm 80 is disengaged from a control lever 85 pivoted at 86 to an arm 87 rigid on the shaft 13 and paralleling the angular extension of the axle 12 which is also rigidly connected with the shaft 13. The control lever 85 is held in the locking position shown in Figure 4 by a spring 88 and carries at its lower end a roller 89 for normally engaging either of the lever arms 79 and 80, whereby to render the clutch inoperative. In the normal position of the lever 85 the roller 89 is within one of the notches 90 formed by the relatively long and short lugs 91 and 92 respectively which are projected from the casing 60 as shown in Figure 5. The control lever 85 is adapted to be moved to release position by a flexible member 93 held by a guide 93a on the ratchet bar 67, the rod having an operating cable 94 connected with a link 95 depending from an eye bolt 96 secured to the upper end of the lever 37. Upon release of the clutch from the position shown in Figure 1 the spring 84 will move lever 81, link 83 and lever 75 to position the roller 76 in one of the notches 77 of the drum 59, whereby to couple the wheel 10a with the casing 60, so as to rotate the latter, thus moving the arm 63 in a counter clockwise direction as viewed in Figure 1. This serves, through the medium of the link 64, lever 65 and frame member 67 to raise the main frame to the position shown in Figure 2. During such raising movement the roller will ride upon one of the cams 91 and will automatically drop into one of the notches 90 and engage one or the other of the lever arms 79 and 80 to disconnect the clutch as shown in Figure 4.

To effect lowering of the pivoted plow carrying frame, the lever 85 must be again released, whereby the clutch will again be rendered effective to rotate the casing 61 and arm 63 from the position shown in Figure 2 back to that shown in Figure 1, the link 64 during such movement serving to pull the main frame down and permitting the plows to enter the ground ready for plowing the next succeeding furrow.

The depth at which the plows are to be operated can easily be regulated by raising or lowering the lever 65 as desired, the raising operation being made comparatively easy by the lifting action of the spring means shown in Figs. 9 and 10.

The lever 85 and arm 87 when in normal clutch releasing position as shown in Figure 1 and 4 form means for bracing and supporting the main frame in cooperation with the arm 63, link 64 and U-shaped frame member 67.

In releasing the clutch to permit wheel 10a to raise the plow carrying frame, it is of course necessary to exert a pull on the cable 94 which can be readily done by gripping the link 95 and swinging its lower end forwardly of the lever 37. It will be understood, however, that in moving the yoke 40 to the release position shown in Fig. 6 it is necessary to exert a forward pull on the upper end of the lever 37 and this operation can readily be performed by exerting a forward pull on the link 95. When it is desired to effect release of the clutch and the frame holding means the operator will grip the link and by moving it forwardly he can readily effect release of the clutch and the frame holding means at one operation, either moving one slightly in advance of the other or both simultaneously.

The frame cushioning and lifting means which assists the operator in manually raising the main frame comprises an arm 97 secured to the side frame member 14 and having at its upper end an angular portion 98 for receiving a rod 99, the lower end of which is pivotally secured at 100 to a bracket 101 clamped upon the axle 11 as shown in Figs. 9 and 10. The rod is provided at its lower end with a head 102 for receiving a spring 103 surrounding the rod and having its upper end in engagement with the angular portion 98 of the arm. It will be understood that when the frames are in lowered ground engaging position or with the plows in the operating position shown in Fig. 1 that the spring 103 will be compressed and that upon raising the main frame, either by means of the clutch or manually by means of the lever 65 the spring will assist in the raising operation. Furthermore, in lowering the plow carrying frames from the position shown in Fig. 2 to ground engaging position, the spring will serve to cushion the frames and will check the downward movement thereof whereby to prevent excessive impact of the plow points when striking the ground to avoid breaking of the same.

With the relatively adjustable draft beam and frame construction shown, it is comparatively easy to vary the height of the line of draft in order to vary the depth at which the plows are required to operate under different conditions encountered from time to time, such as a difference in the character of the soil or a variation in the depth of plowing for different crops to be planted. The depth of the furrow will, of course, be regulated by adjustment of the hand lever 65 to vary the height of the frame from the ground, it being understood, however, that the height of the line of draft is dependent to a certain extent on the depth of the furrow to be plowed. It will be further understood that the plows must be kept on a substantially even keel for the various depths at which they operate. It is, therefore, necessary when changing or fixing the height of the line of draft by positioning the front end of the draft beam at the required distance from the ground to level up the plow supporting frame in order to insure operation of the plows on an even keel. This, of course, requires relative movement between the draft beam and the frame which is readily and easily effected by turning the handle 24a of the adjusting screw 22. With this means a quick and relatively fine adjustment can be effected in levelling up the frame to place the plows on an even keel for effective operation at the depth determined upon.

While I have illustrated and described one embodiment of my invention, it will be understood that different modifications of the construction shown may be readily made without departing from the principles of the invention as embodied in the claims.

I claim as my invention:

1. A plow comprising in combination, a pair of wheels, a frame carried by and arranged to swing relative to the wheels, lifting mechanism for said frame arranged to be connected with one of the wheels for operation thereby during advancement of the machine, a control element movable to condition said mechanism for connection with said wheel, a second frame adjustable to different operating positions upon the main frame, plowing implements carried by said second frame, a releasable holding device for supporting the second frame in its different positions of adjustment, release means for said holding device including a manually operable part and a manually operable device for said control element associated with said part, said device and said part being arranged each for independent operation and also for joint operation by the use of one hand.

2. A plow comprising in combination, a pair of wheels, a main frame carried by and arranged to swing relative to the wheels, lifting mechanism for said frame arranged to be connected with one of the wheels for operation thereby during advancement of the machine, a control element movable to condition said mechanism for connection with said wheel, a second frame adjustable to different operating positions upon the main frame, plowing implements carried by said second frame, a releasable holding device for supporting the second frame in its different positions of adjustment, release means for said holding device including a movable part, and an operating device for said control element and said part arranged to effect simultaneous operation of the same and independent operation of each, one in advance of another.

3. A plow comprising, in combination, a pair of wheels, a main frame carried by and arranged to swing relative to the wheels, lifting mechanism for said frame arranged to be connected with one of the wheels for operation thereby during advancement of the machine, a control member movable to condition said mechanism for connection with said wheel, a second frame adjustable to different operating positions upon the main frame, plowing implements carried by said second frame, a releasable holding device for supporting the second mentioned frame in its different positions of adjustment, release means for said holding device including a lever, and operating means for said control member comprising a flexible device interposed between the control member and said lever, said lever and flexible device being arranged for joint operation by the use of one hand and also for separate and independent operation, one in advance of another.

4. A plow comprising in combination, a pair of wheels, a main frame carried by and arranged to swing relative to the wheels, lifting mechanism for said frame arranged to be connected with one of the wheels for operation thereby during advancement of the machine, a control element movable to condition said mechanism for connection with said wheel, a second frame adjustable to different operating positions upon the main frame, plowing implements carried by said second frame, a releasable holding device for supporting the second frame in its different positions of adjustment, release means for said holding device including a pivoted element, an operating device for said control element comprising a pair of relatively movable parts, one of which is connected with the control element and the other with the pivoted element, said last mentioned part being manually operable to effect operation of the other part and also operation of the pivoted element.

5. A plow comprising in combination, a pair of wheels, a frame carried by the wheels and arranged to swing relative thereto, lifting means for said frame arranged to be connected with one of the wheels for operation thereby during advancement of the machine, a control element movable to condition said mechanism for connection with said wheel, a second frame mounted on the main frame, plowing implements carried by the second frame, holding means for securing the second frame in different positions of adjustment upon the main frame, releasable means for said holding means including a manually operable member on the main frame and means for actuating said control element including a second manually operable member arranged to operate the first.

6. A plow comprising in combination, a pair of wheels, a frame carried by and arranged to swing relative to the wheels, lifting mechanism for said frame arranged to be connected with one of the wheels for operation thereby during advancement of the machine, a control element movable to condition said mechanism for connection with said wheel, a second frame adjustable to different operating positions upon the main frame, plowing implements carried by said second frame, an adjustable support for holding the second mentioned frame in its different positions of operation, release means for said support comprising a lever having a connection extending therefrom to the support, and a manually operable device for said control element including relatively movable parts, one of which forms an operating member for the other and also an operating member for said lever.

7. A plow comprising in combination, a pair of wheels, a main frame carried by and arranged to swing relative to the wheels, means for raising and lowering the frame, a second frame mounted for rotation upon the main frame to different positions of adjustment, oppositely disposed plowing implements upon the second frame, a pivoted holding device for supporting the second frame in its different positions of adjustment, a draft beam pivotally mounted upon the main frame, a feed screw mounted to swing between the beam and said main frame to adjust one relative to another, a member pivotally connected with the draft beam and an operating connection between said member and said holding device arranged to effect release of the latter upon movement of said member in one direction.

8. A plow comprising in combination, a pair of wheels, a main frame carried by and arranged to swing relative to the wheels, means for raising and lowering said frame, a second frame mounted for rotation upon the main frame to different positions of adjustment, oppositely disposed plowing implements upon the second frame, a transverse bar carried by the main frame, a draft beam pivoted intermediate its ends upon the main frame, an adjusting screw connected with the rear end of the draft beam and means on said transverse bar arranged to rotatably support the screw.

9. A plow comprising in combination, a pair of wheels, a main frame carried by and arranged to swing relative to the wheels, means for raising and lowering the frame, a second frame mounted for rotation upon the main frame to different positions of adjustment, oppositely disposed plowing implements upon the second frame, a transverse bar supported by said main frame, a pivoted holding device mounted upon said transverse bar and arranged to support the second mentioned frame in its different positions of adjustment, a draft beam pivotally mounted intermediate its ends upon the main frame, and an adjusting element for the beam connected with said transverse bar and arranged to effect relative adjustment between the main frame and the beam.

10. A plow comprising in combination, a pair of wheels, a main frame carried by and arranged to swing relative to the wheels, means for raising and lowering the frame, a second frame mounted for rotation upon the main frame to different positions of adjustment, oppositely disposed plowing implements upon the second frame, a transverse bar carried by the main frame, a draft beam pivoted intermediate its ends upon the front of the main frame, an adjusting screw rotatably connected with said transverse bar, and a member pivotally mounted upon the rear end of said draft beam in which said screw is threaded.

11. A plow comprising in combination, a pair of wheels, a main frame carried by and arranged to swing relative to the wheels, means for raising and lowering said frame, a second frame mounted for rotation upon the main frame to different positions of adjustment, oppositely disposed plowing implements upon the second frame, a transverse bar supported by said main frame, upstanding members carried by said bar, a holding device pivoted on said members and arranged to receive opposite portions of the second frame to support the latter in different positions of adjustment, a draft beam pivotally mounted intermediate to ends upon the main frame, a bracket carried by said transverse bar, an adjusting screw for the draft beam interposed between the rear end of the latter and the bracket, a pivoted latch for said second frame mounted on said upstanding members and spring pressed means for automatically returning said latch to holding position arranged to be guided by said bracket.

12. A plow comprising in combination, a main frame, a pair of wheels, a crank axle connecting the wheels on which said frame is arranged to swing, means for raising and lowering the frame, a second frame mounted for rotation upon the transverse portion of the axle through a circle to different positions of adjustment, oppositely disposed plowing implements on the second frame, a holding device on the main frame for supporting the second frame in its different positions of adjustment, release means for said holding device, an arm extending upwardly from one side of the main frame, a vertically disposed rod pivotally connected with one of the crank portions of the axle arranged to be guided by said arm and a spring on the rod arranged to engage the arm, said spring tending to lift the main frame when the latter is in lowered position and serving to cushion the same when lowered from a raised position.

13. A plow comprising in combination, a pair of wheels, a crank axle connecting the same comprising a transverse bar having crank arms at its opposite ends, a main frame arranged to swing upon the axle, a second frame mounted to swing transversely of and upon the axle through a circle to different positions of adjustment, right and left hand plowing implements carried by said second frame for alternate engagement with the ground, means for holding the second frame in adjusted position upon the main frame, means for elevating and lowering said main frame, a pair of adjacent upstanding elements one on said main frame and the other on one of said crank arms, one of said elements forming a guide for the other, and a vertically disposed spring on one of said elements forming a yielding support for the other whereby to afford cushioning means for said main frame when moving from a raised to a lowered position.

14. A plow comprising in combination a pair of wheels, a crank interposed between the wheels, a main frame connected with the crank, a rotatable frame carrying oppositely disposed plows, releasable holding means for the rotatable frame, lift mechanism arranged to be conditioned for effecting relative movement between the crank and main frame whereby to lift the plow carrying frame and manually operable associated devices, one for conditioning said lift mechanism and the other for releasing said holding means, said devices being arranged each for independent operation at different times and also for joint operation at the same time.

15. A plow comprising in combination, a pair of wheels, a crank interposed between the wheels, a main frame connected with the crank, a rotatable frame carrying oppositely disposed plows, releasable holding means for the rotatable frame, lift mechanism arranged to be conditioned for effecting relative movement between the crank and main frame whereby to lift the plow carrying frame, means including a lever for effecting release of the holding means and a flexible element associated with the lever for controlling said lift mechanism, said lever and flexible element being arranged for independent operation at different times and also for joint operation at the same time by the use of one hand.

16. A plow comprising in combination a pair of wheels and a crank axle connecting the same, a main frame including spaced side portions pivoted upon the crank axle and extending forwardly of the wheels and having their ends converging substantially to a point in advance of the wheels, a transverse connecting member between said side portions located in rear of said ends and in advance of the axle, a second frame mounted upon the axle and extending forwardly thereof and having its front end terminating adjacent said transverse member, supporting means for the second frame mounted on said transverse member, a plow carried by the second frame, a draft beam pivoted intermediate its ends on the front ends of said converging side frame portions and having its rear end disposed opposite said transverse member, a member pivoted upon the rear end of the draft beam and means interposed between said transverse member and said pivoted member adjustably mounted in one of said members to permit the beam to swing upon its pivot.

17. A wheeled plow comprising in combination a pair of connected wheel supported frames one of which is mounted to move relative to the other, releasable control means for effecting relative movement between said frames, releasable means for supporting one of the frames upon the other and manually operable associated devices one for releasing the control means and the other for releasing the supporting means, said devices each being arranged for independent operation at different times and also for joint operation at the same time.

18. In a plow, the combination of a frame, a second frame provided with a plurality of plowing implements and associated with said first frame for rotation progressively in the same direction about a transverse axis to different operating positions by contact with the ground, wheel means for supporting said frames, fixed transversely extending bearings on said first frame spaced from the axis of the wheels, crank arms connected with said wheels and operating in said bearings to support said frames in elevated relation to said wheels, releasable means for securing said crank arms in frame supporting position, a pair of adjacent upstanding relatively movable elements one on said first frame and another supported by one of said crank arms and a vertically disposed compression spring interposed between said elements having its lower end resting on one and its upper end engaging the other whereby to afford cushioning means for said frames when lowered from elevated position.

19. In a plow, the combination of a frame, a second frame provided with a plurality of plowing implements and associated with said first frame for rotation progressively in the same direction about a transverse axis to different operating positions by contact with the ground, wheel means for supporting said frames, fixed transversely extending bearings on said first frame spaced from the axis of the wheels, crank arms connected with said wheels and operating in said bearings to support said frames in elevated relation to said wheels, releasable means for securing said crank arms in frame supporting position, a pair of adjacent upstanding elements one extending above and fixed on said first frame and having an offset portion and the other having its upper end guided by said offset portion and its lower end pivotally supported by one of said crank arms and a vertically disposed spring having its lower end supported by said last mentioned element and its upper end engaging the offset portion of the other element whereby to afford cushioning means for said frames when lowered from an elevated position.

HENRY J. NEUFANG.